Patented Jan. 28, 1930

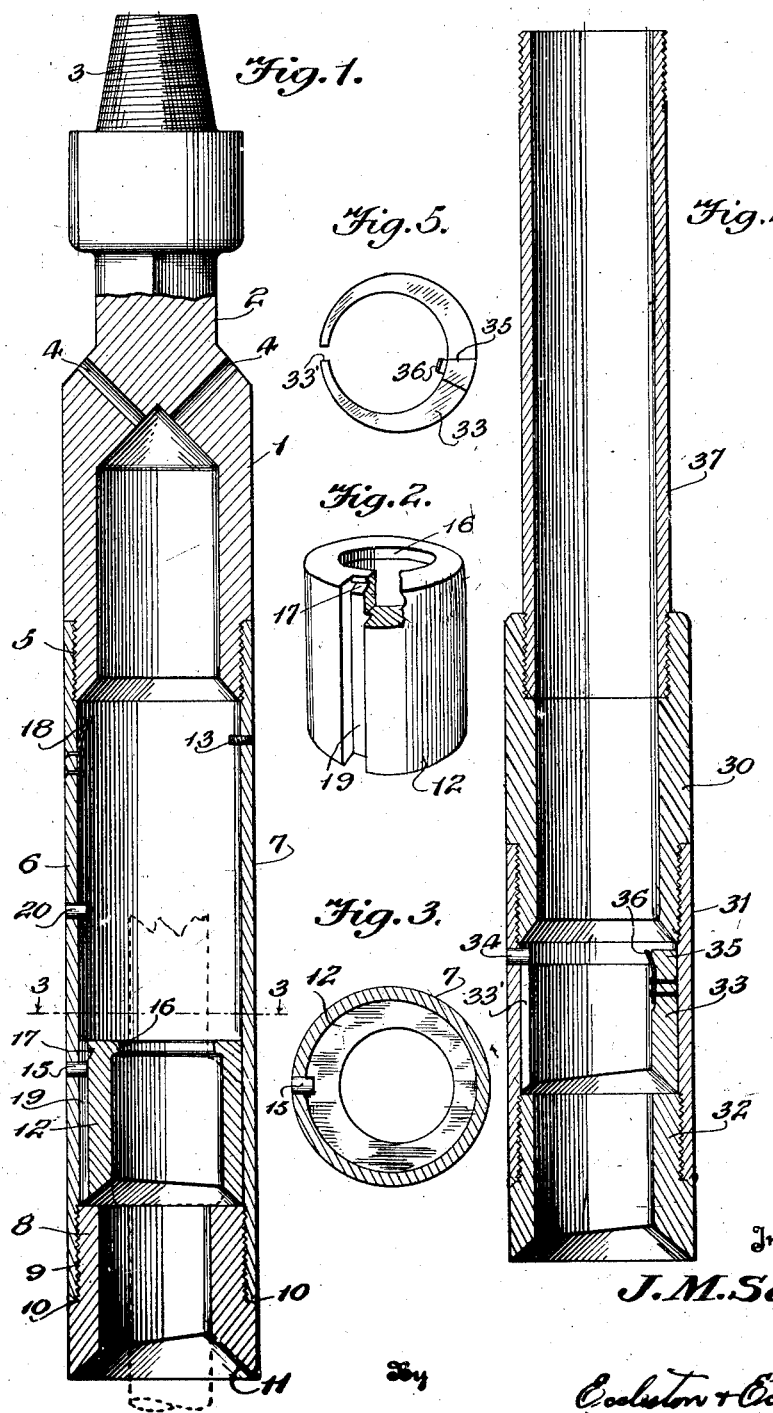

1,745,274

UNITED STATES PATENT OFFICE

JOHN M. SAULS, OF PAMPA, TEXAS

FISHING TOOL

Application filed February 1, 1928. Serial No. 251,106.

The present invention relates to tools commonly known as fishing tools utilized for recovering deep well drilling implements lost in the well. Frequently, the sucker rod, drill stem or other parts of the apparatus used in drilling or working the well becomes broken, and it is essential that the detached implement be removed from the well in order that the drilling operations may proceed as well as to avoid the loss of the drill bit or other element lost in the well. Ordinarily, fishing tools for this purpose comprise a plurality of wedge members or slips provided with teeth which are wedged into biting contact with the pipe or other element when the tool is properly positioned thereover. Such tools, however, have the disadvantage that they cannot be made sufficiently small to enter some of the smaller well cavities, and also that due to the size of the slips and the parts associated therewith the tool is not adapted to pass over and secure some of the larger apparatus which may be lost in a well.

An object of the present invention resides in the provision of a tool capable of entering the small well cavities as well as the large one so as to operate upon lost implements inaccessible to tools of the slip socket type.

Another object of the invention consists in the provision of a fishing tool which may be operated from the surface of the ground to engage or release a "fish" and which is positive in operation.

A further object of the invention resides in the construction of means by which the movable elements of the fishing tool may be positively locked in inoperative position where it is found that a "fish" which has been engaged by the tool cannot be withdrawn from the well.

Another object of the invention consists in a fishing tool which is so designel as to adapt itself to the setting of liners in oil, gas and water wells.

A still further object of the invention is to provide a fishing tool in which water or other liquid may be forced downwardly through and around a "fish" or may pass upwardly through the fishing tool as the latter is lowered into the well.

Other objects and advantages of the invention will be apparent from the following description; in which Figure 1 is a longitudinal section through the novel tool with a "fish" engaged thereby.

Figure 2 is a perspective view of the bushing of Figure 1, parts being broken away.

Figure 3 is a horizontal section on line 3—3 of Figure 1.

Figure 4 is a longitudinal section of a modified form of the tool; and

Figure 5 is a plan view of the bushing shown in Fig. 4.

Referring to the drawing in greater detail the numeral 1 designates a head or socket member provided with a squared neck 2 adapted to receive the jaws of a wrench, and threaded at its upper end as indicated by numeral 3 for connection with the lower end of the drill stem or tubing; although in the preferred form the tool may be suspended from a cable. This socket member is also provided with cavities 4 through which water or other liquid may be allowed to circulate as the tool is lowered and raised in the well.

Threaded to the lower end of the socket member 1 by means of threads 5 is a barrel 6 which comprises the cylindrical member 7 and the eccentrically bored member 8 which is threaded to the lower end of the cylindrical member 7 as indicated by numeral 9. In order to securely hold this eccentrically bored portion 8 of the barrel to the cylindrical member 7 I have found it desirable to weld the same thereto as indicated by numeral 10. The barrel, of course, is flared at its lower end as indicated by numeral 11 so as to serve as a guide in directing the upper end of the "fish" into the interior of the barrel.

Mounted within the barrel for reciprocatory movement is a bushing 12 which is also provided with an eccentric bore and which is adapted to cooperate with the barrel portion so as to lock a "fish" within the tool so that it may be elevated to the surface of the ground.

The purpose of the eccentrically bored portion, of course, is to force the implement being recovered over to one side of the barrel in order that it may engage over the upper shoulder of the eccentric bore in the lower end of the barrel. To this end the bushing 12 is slidably mounted within the cylindrical member 7 and is held against rotary movement by means of pin 15 which extends inwardly of the member 7 and engages the vertical slot 19 in the exterior wall of the bushing. The bushing 12 is also provided with an inwardly turned portion 16 at its upper edge for engagement by a portion of a "fish" to be recovered. As the tool is lowered into the well the "fish" will raise the bushing 12 by engagement with the lower edge thereof or with the inturned portion 16. In order to prevent rotary movement of the bushing 12 after it leaves the pin 15, a pin 20 is provided which extends inwardly of the member 7. When the bushing 12 reaches a position somewhat above the portion 8, the shoulder of the "fish" will pass through the bushing and the latter will be allowed to drop to the position shown in Figure 1. If the tool is now raised it will be obvious that the "fish" will become locked to the tool as indicated in dotted lines in Figure 1.

The inturned portion 16 has an additional function in that it also serves through its engagement with the "fish" to lift the bushing upwardly with respect to the barrel 6 so that a notch 17 of the bushing may engage over a spring detent 18 riveted to the interior of the cylindrical member 7 adjacent the upper end thereof. The spring detent 18 and the notch 17 have as their function to support the bushing 12 out of cooperative relationship with the barrel 8 and thus prevent engagement of the tool with a lost implement or "fish" which it has been found impossible to withdraw from the well cavity.

In order to prevent unintentional engagement of the notch 17 and detent 18 I place a frangible screw 13 in the wall of the cylindrical member 7, said screw being positioned slightly below the detent and preferably diametrically opposed thereto. Under ordinary fishing operations, therefore, it will be apparent that accidental engagement of detent 18 with the notch 17 is avoided. However, when it is found that a "fish" cannot be withdrawn, sufficient force is applied to the tool to cause the bushing to shear the relatively weak screw 13 and pass upwardly into engagement with the detent 18 where it is locked against further movement until drawn to the surface and released.

In the operation of the tool as disclosed in Figures 1, 2 and 3 the apparatus is lowered into the well with the eccentric bores of the barrel 8 and bushing 12 in the positions shown. The implement being directed to the interior of the barrel by reason of the beveled lower end 11 of the barrel will engage either the bottom of the bushing 12 or the inturned portion 16 and raise the bushing upwardly until such position is reached as will allow the bushing to slip past the shoulder of the "fish" and return to its lower position, thereby locking the "fish" to the tool. As the tool is lowered into the well the passages 4 allow the water in the well to pass upwardly through the tool, and conversely as the tool is raised the passages 4 allow the water to pass downwardly through the tool.

If repeated efforts to withdraw the "fish" are unavailing, then it is necessary that the "fish" be released and other means be resorted to for clearing the well cavity. In order to release the "fish" and permit the tool to be raised to the surface the barrel is lowered with sufficient force to cause the pin 13 to be sheared off. The bushing 12 may then move upwardly into engagement with the detent 18 whereby it is locked against further cooperative relationship with the fish; thus allowing the tool to be withdrawn from the well. By reason of this feature of the apparatus, I provide an effective means for preventing the fishing tool from being lost due to a permanent engagement thereof with the "fish" being operated upon.

In the modified form of the construction shown in Figures 4 and 5, the barrel comprises the sections 30 and 31 and the eccentrically bored member 32, which is threaded to the lower end of the member 31 and also welded thereto as previously described in connection with the form of invention shown in Figures 1, 2 and 3. The bushing 33 in this form of the invention is also provided with an eccentric bore so as to wedge the "fish" over to one side of the tool in order to engage its shoulder over the upper end of the thicker wall of the barrel 32. In this embodiment of the invention also a pin 34 is provided so as to control relative rotation between the barrel and bushing by reason of engagement of the pin with shoulders provided by the abutment 35 on the upper end of the bushing. Obviously, a slot 33' is necessary in order that the bushing may pass the pin 34 in assembling the parts.

In order to releasably hold the bushing 33 in engagement with the "fish" to be recovered from the well, I provide a spring finger 36 which is secured within the bushing and adapted to frictionally engage the "fish" so as to initially prevent rotation of the bushing when the barrel is rotated so as to bring the thicker walls of the bushing and barrel into diametrically opposed positions for locking the "fish" within the tool. In this form of the invention a pipe section 37 of any desired length is employed in lieu of the socket 1 for uniting the tool to the supporting means. By reason of this connection, it will be apparent that the broken tubing or the like which it is desired to recover may pass upwardly in the apparatus so that the first, second or third joint thereof may be engaged by the tool.

Furthermore, in the latter form of the invention, the connection 30 and related parts allows water to be circulated about the "fish" in order to loosen the latter in the event that it cannot be readily withdrawn.

Both forms of the invention disclosed herein are not only serviceable in the recovery of tools, tubing, etc., but also have the additional function of facilitating the setting of well screens, liners, etc. Such devices are all provided with collars on their upper ends, and obviously can be readily attached to the present tool in the manner heretofore described in connection with the recovery of "fish" from a well.

From the foregoing description taken in connection with the accompanying drawing, it will be apparent to those skilled in the art that I have devised an exceedingly simple and relatively inexpensive fishing tool which is adapted to enter cavities too small to admit the conventional type of fishing tool; that the tool may be operated at the surface of the ground to engage or release a "fish"; that means are provided for positively securing the tool in inoperative position; and that by reason of the provision which permits a circulation of water any implement which has become stuck within the well cavity may be ordinarily released.

In accordance with the patent statutes I have described what I now believe the preferred embodiments of my invention, but it is to be understood that various changes in the details of construction may be made without departing from the spirit of the invention and all such modifications are intended to be included within the scope of the appended claims.

Having fully described the invention, what I claim as new and desire to secure by Letters Patent is:

1. A fishing tool including an eccentrically bored barrel, an eccentrically bored bushing disposed in substantial alignment with said barrel, said barrel and bushing being relatively rotatable.

2. A fishing tool including an eccentrically bored barrel, an eccentrically bored bushing disposed in substantial alignment with said barrel and rotatable with respect to the barrel.

3. A fishing tool including an eccentrically bored barrel, an eccentrically bored bushing disposed in substantial alignment with said barrel, said barrel and bushing being relatively rotatable, and cooperating means on the barrel and bushing for controlling the relative movements thereof.

4. A fishing tool including an eccentrically bored barrel, an eccentrically bored bushing disposed in substantial alignment with said barrel, said barrel and bushing being relatively rotatable, and means on said bushing to be engaged by a "fish" to prevent rotation of the bushing.

5. A fishing tool including an eccentrically bored barrel, an eccentrically bored bushing disposed in substantial alignment with said barrel, means on said bushing to be engaged by a "fish" to normally prevent rotation of the bushing, and means on the barrel to limit its rotative movement with respect to the bushing.

6. A fishing tool including an eccentrically bored barrel, an eccentrically bored bushing disposed in substantial alignment with said barrel, means on said bushing to be engaged by a "fish" to normally prevent rotation of the bushing, a shoulder on an edge of the bushing, and a pin on the barrel to engage the shoulder in certain relative positions of the bushing and barrel.

7. A fishing tool including a socket member, a barrel threaded thereto, said barrel provided with an eccentric bore in the lower end thereof, and means cooperating with said eccentric bore for engaging a "fish."

8. A fishing tool including a socket member provided with one or more passages therein, a barrel threaded to the socket member, said barrel provided with an eccentric bore in the lower end thereof, and means cooperating with said eccentric bore for engaging a "fish."

JNO. M. SAULS.